(12) United States Patent
Reichel et al.

(10) Patent No.: US 6,782,832 B2
(45) Date of Patent: Aug. 31, 2004

(54) SUPPORT FOR A TRACK-GUIDED HIGH-SPEED VEHICLE

(76) Inventors: Dieter Reichel, Badstrasse 13, D-92318, Neumarkt (DE); Jürgen Feix, Kerschensteiner Strasse 36, D-82110, Germering (DE)

( * ) Notice: Subject to any disclaimer, the term of this patent is extended or adjusted under 35 U.S.C. 154(b) by 0 days.

(21) Appl. No.: 10/129,997

(22) PCT Filed: Sep. 1, 2001

(86) PCT No.: PCT/EP01/10099

§ 371 (c)(1),
(2), (4) Date: Sep. 30, 2002

(87) PCT Pub. No.: WO02/22956

PCT Pub. Date: Mar. 21, 2002

(65) Prior Publication Data

US 2003/0154877 A1 Aug. 21, 2003

(30) Foreign Application Priority Data

| Sep. 12, 2000 | (DE) | 100 45 336 |
| Dec. 22, 2000 | (DE) | 100 64 724 |
| Mar. 13, 2001 | (DE) | 101 11 918 |
| Apr. 30, 2001 | (DE) | 101 20 909 |
| Jul. 12, 2001 | (DE) | 101 33 318 |
| Jul. 12, 2001 | (DE) | 101 33 316 |
| Jul. 12, 2001 | (DE) | 101 33 337 |

(51) Int. Cl.$^7$ .............................................. B61B 12/04
(52) U.S. Cl. ................................... 104/124; 104/281
(58) Field of Search ..................... 104/118, 119, 104/120, 123, 124, 125, 126, 281, 282; 105/141, 144, 145; 52/174, 143

(56) References Cited

U.S. PATENT DOCUMENTS

| 3,212,390 A | 10/1965 | Litzkow |
| 3,841,223 A | * 10/1974 | Bertin .................. 104/23.2 |
| 3,890,904 A | * 6/1975 | Edwards .................. 104/121 |
| 4,375,193 A | * 3/1983 | Sullivan .................. 104/118 |
| 4,620,358 A | 11/1986 | Miller et al. |
| 4,631,772 A | 12/1986 | Bonasso |
| 4,698,895 A | * 10/1987 | Miller et al. .................. 29/464 |
| 4,854,028 A | 8/1989 | Buchler et al. |
| 4,856,173 A | 8/1989 | Maier et al. |
| 4,870,906 A | 10/1989 | Schaffer et al. |
| 4,905,359 A | 3/1990 | Maier et al. |
| 4,909,474 A | 3/1990 | Buchler et al. |
| 4,970,773 A | 11/1990 | Buchler et al. |

(List continued on next page.)

FOREIGN PATENT DOCUMENTS

| CH | 653729 | 1/1986 |
| DE | 928047 | 4/1955 |
| DE | 2216484 | 10/1973 |

(List continued on next page.)

OTHER PUBLICATIONS

Dywidag–Berichte VIII, 1969, NR. 2.
Patent Abstracts of Japan No. M–1126, Jun. 20, 1991.
U.S. application Ser. No. 10/169,822, Jul. 9, 2002.

(List continued on next page.)

Primary Examiner—Mark T. Le
(74) Attorney, Agent, or Firm—Dority & Manning

(57) ABSTRACT

A beam for a railway track guided vehicle system configured to be supported at spatial intervals on piers includes an upper flange disposed along a longitudinal length of the beam. The upper flange has opposite laterally outward portions configured for receipt of functional elements for guidance of a track vehicle. Opposite side webs extend downwardly from the upper flange along the longitudinal length of the support. A lower flange is disposed at ends of the webs opposite from the upper flange and is disposed longitudinally along the length of the support. The beam includes a uniform cross-sectional shape along a longitudinal length thereof so as to generate favorable air flow conditions for the track guided vehicle. The lower flange has a lateral dimension so as to essentially cover an underlying pier. In this way, the pier does not cause air flow disturbances to the track guided vehicle.

16 Claims, 4 Drawing Sheets

U.S. PATENT DOCUMENTS

| | | |
|---|---|---|
| 4,987,833 A | 1/1991 | Antosh |
| 5,027,713 A | 7/1991 | Kindmann et al. |
| 5,131,132 A | 7/1992 | Kindmann et al. |
| 5,370,059 A | 12/1994 | Raschbichler et al. |
| 5,437,072 A | 8/1995 | Dinis et al. |
| 5,651,318 A * | 7/1997 | O'Donohue ............... 104/124 |
| 5,823,114 A | 10/1998 | Cioletti et al. |
| 5,850,794 A | 12/1998 | Raschbichler et al. |

FOREIGN PATENT DOCUMENTS

| | | |
|---|---|---|
| DE | 3322019 A1 | 12/1984 |
| DE | 3412584 A1 | 10/1985 |
| DE | 3639265 A1 | 6/1988 |
| DE | 3709619 A1 | 10/1988 |
| DE | 3825508 C1 | 10/1989 |
| DE | 3924486 C1 | 1/1991 |
| DE | 4021834 A1 | 1/1992 |
| DE | 4115935 A1 | 11/1992 |
| DE | 4115936 A1 | 11/1992 |
| DE | 92177921 | 8/1993 |
| DE | 4238310 A1 | 3/1994 |
| DE | 29612404 | 10/1996 |
| DE | 19619866 | 11/1997 |
| DE | 19805086 | 7/1998 |
| DE | 29809580 | 10/1998 |
| DE | 19841936 | 4/2000 |
| DE | 19919703 | 11/2000 |
| EP | 0987370 A1 | 3/2000 |
| GB | 2109437 | 6/1983 |
| WO | WO 99/51455 * | 10/1999 |
| WO | 0001888 | 1/2000 |
| WO | 0020688 | 4/2000 |

OTHER PUBLICATIONS

U.S. application Ser. No. 10/129,886, May 10, 2002.
U.S. application Ser. No. 10/169,851, Jul. 9, 2002.
U.S. application Ser. No. 10/129,999, May 13, 2002.
German Patent Office Search Report 100 64724.3, Jul. 11, 2001.
German Patent Office Search Report 101 11 918.6, Dec. 12, 2001.
German Patent Office Search Report 101 33 316.1, Mar. 8, 2002.
EPO Search Report PCT/EP01/10099, Dec. 14, 2001.
U.S. patent application Ser. No. 10/049,096, filed Jun. 18, 2002.

* cited by examiner

SUPPORT FOR A TRACK-GUIDED HIGH-SPEED VEHICLE

FIELD OF THE INVENTION

The present invention concerns a support (hereinafter "beam") for a track guided high speed vehicle, especially a magnetically levitated railroad, wherein the beam is supported at intervals on piers and on the outer side of said beam, wherein the functional elements are placed for the guidance of a vehicle.

BACKGROUND

DE 41 15 935 C2, for example, has made known a travel-way construction for magnetically levitated railroads, in which fittings for the guidance of a vehicle are placed on a beam and directed toward the inside. The beam itself is U-shaped, when seen in cross-section. The beam is supported on piers whereby, for the better acceptance of the beam, holders are provided, in which the beams lie. The holders extend themselves around the U-shaped cross-section on the outside and thus stabilize the beam. The holders themselves are in turn supported by bearing surfaces on the piers. Disadvantageous in the case of such a travel-way is that the beam exhibits a relatively great degree of elasticity due to the open beam construction. Although the equipment placements must be exactly aligned with each other in order to guide a vehicle, with this design of the travel-way, the satisfactory stabilization of the beam and the positioning of the equipment components is only possible with the aid of the holder.

DE 38 25 508 C1 discloses a travel-way which is comprised of a hollow essentially T-shaped beam. On the outer sides of the upper flanges of the beam are placed functional elements for the guidance of a magnetically levitated vehicle. The beam itself is supported on individual piers, whereby the piers possess holders which grip the bases of the beam; Disadvantageous in the case of a beam of this type is that although the design permits far more precise positioning of the functional elements to one another than is required by the travel-way constructed according to DE 41 15 935, in spite of this, the beam still shows a poor torsion rigidity.

This comes into effect particularly during extreme high speeds of a vehicle, such as, for instance, speeds in excess of 500 km./h, often exhibiting itself as a rough ride of a vehicle.

It is disadvantageous in the case of the above described embodiments of the state of the technology that, especially during the said high speeds of modern magnetically levitated vehicles, the-flow resistance of the beams and their supporting means prevent a smooth run of a vehicle. The holders of the beams or the piers, on which the beams are supported, cause periodic buffets on a vehicle when the pressurized air encounters their resistance.

SUMMARY

Thus one feature of the invention is to furnish, by means of an appropriate adaptation of the beam to high speed magnetically levitated railroads, a smooth and comfortable run of magnetically levitated vehicles. Additional objects and advantages will be set forth in part in the following description, or may be obvious from the description, or may be learned through practice of the invention.

If the outer surface of the beam is constructed with concern given to a favorable airflow in relation to a vehicle, wherein—as seen in the longitudinal direction of the beam—no cross-sectional changes occur, and the formation of the beam predominantly covers the piers in relation to a vehicle, then in an advantageous and inventive manner the effect is that the air pushed away from a vehicle can uniformly escape. Thus a smooth run of a vehicle is assured. By means of the invented design of the beam, at the same time, a uniform comfortable run of a vehicle is effected. Because of the fact that the cross-section of the beam predominantly remains unchanged, no repeated flow impacts against a vehicle. A uniform airflow is also brought about in that in relation to a vehicle, the piers are covered and thus the support of the beam does not interfere with the escape of the pressurized air from a vehicle. This also contributes to a uniform run of a vehicle.

It is particularly an advantage, if the beam is so designed, that it possesses a lower flange, which covers the piers or shields them in a favorable manner in respect to vehicle slipstream. When this is done, because of the shaping of the basic form of the beam, the airflow at any one pier immediately slides by without impingement. In addition, or alternatively, it can be advantageous if the beam is equipped with a console essentially covering the pier which is shaped or located to be air-flow friendly.

It is an advantage, if the beam has at least one opening for the inspection of its hollow space. In this way, the accessibility and the monitoring of the reliability of the beam is easier during the regularly scheduled inspections. Personnel can enter through the opening into the interior of the beam to lay and maintain supply lines and/or communication lines which are dependent on or independent of vehicle operation. By means of these uses of the hollow space of the beam, a very economical laying of lines can be carried out. Also, lines which have nothing to do with the operation of a vehicle can be laid along the now available stretch of the magnetically levitated railroad to take advantage of a very economical kind of line running. Thus it can also be avoided that separate beams need be installed, for example for communication lines or that these lines must be laid separately underground.

Advantageously, the beam has an airflow friendly clearance space for the reception of the guide elements, which the functional units of a vehicle occupy. This clearance space is designed to follow the beam in the flange area, without essential cross-sectional changes. In this way, the escape flow of vehicle displaced air is positively influenced. Moreover, an I-beam is created which possesses a particularly high stability, torsion resistance and load capacity.

The placement of the beam on the piers is advantageously done in such a manner that the bearing elements are placed on the lower flange of the beam. The bearing elements as well as the piers are, in this way, covered over by means of the outwardly extending lower flange which covers said piers. Airflow impacts may be avoided by this measure.

A particularly advantageous mode of construction of the beams is found therein in that the beam is made of concrete, in particular out of precast concrete components. By this means, a very precise and error-free manufacture of the beam can be carried out in a fabrication plant. For instance, in this way, a dependency on weather conditions during the manufacture of the beam, such as site manufacture would entail, is avoided.

In order to attain a particularly high degree of stability of the beam, it is of advantage if the lower flange is broader than the upper flange. For the rigidity of the beam, it is of advantage if it has a bulkhead or haunches. The cross-sectional shape of the beam can, with this advantage, be made to smaller measurements but still maintain the same structural rigidity. If haunches are placed in the beam then, besides the increased rigidity, also a simple anchorage for tensioning members is created.

Where curving is concerned, the beam advantageously forms a spatial curve, in that the beam is supported about a rotation of its longitudinal axis and by means of a lengthening and/or a shortening of the cantilever arm, a radius is formed.

A further possibility for making the curve would be that the upper flange of the beam is constructed in a rotation about its longitudinal axis and by means of extending and/or shortening the cantilever arm, a radius is formed.

A spatial curve of the beam can also be constructed in that fastening consoles of the functional elements in the run of the longitudinal axis of the beam are offset vertically, and by the lengthening and/or the shortening of the fastening consoles, a radius is built.

It has been determined in an advantageous and inventive manner that the curve adjustment of the beam can be carried out quicker, more economically and more exactly, if the beam components in the arc are shorter, and thereby need less individual adjustment, than is advantageous in the straight-line components which have fewer supports. The shorter beams maintain their rigidity, consume less material, and can be built less high than the straight components, which have a greater distance between supports.

If the hollow space of the beam is open at the bottom, wherein the lower flanges are of two parts, then a less heavy and more economical beam is made. This frequently can fulfill the required demands in regard to structural rigidity.

If the hollow space possesses bulkheads, then the beam is additionally stiffened.

Further advantages are to be acquired from the embodiments depicted in the following. There is shown in:

DESCRIPTION

Figure 1:
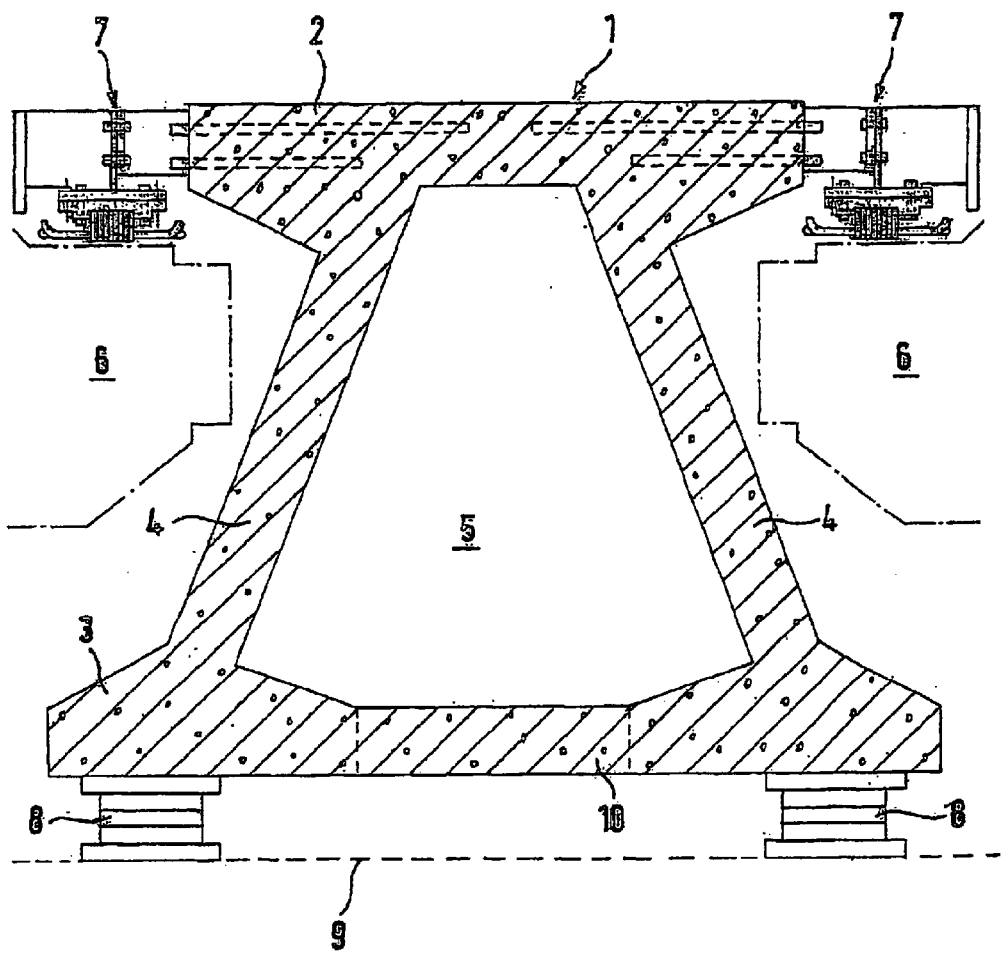
FIG. 1 is a cross-section through an invented beam.

Reference will now be made in detail to embodiments of the invention, examples of which are shown in the drawings. Each embodiment is provided by way of explanation of the invention, and not meant as a limitation of the invention. It is intended that the invention include modifications and variations to the embodiments described herein.

In FIG. 1, a cross-section of an invented beam 1 is presented. The beam 1 is made from a prefabricated concrete component, and has an upper flange 2 and a lower flange 3. The upper flange and lower flanges 2 and 3 are bound together by means of webs 4 and so form a hollow space 5. For entry of inspection personnel or for the laying of lines in the hollow space 5, an opening 10 is provided. One opening 10 per beam usually suffices, but preferably a plurality of openings 10 is favorable for simple accessibility to the hollow space 5. If a large number of openings 10 are provided, then this can lead to a clear reduction in the use of concrete and thus also lead to a more favorable manufacturing cost for the beam 1.

The webs 4, in relation to the upper flange 2 and the lower flange 3, are placed to make a trapezoidal cross-section. This arrangement brings about a still better support of the beam 1 as well as contributing more to its stiffness than is achieved in comparison with the current state of the technology. The beam, by means of this formation, is extremely torsion resistant and assures thereby a reliable and disturbance free operation of a vehicle.

Between the upper flange 2 and the lower flange 3, a clearance space 6 is allowed, in which the guide components of the magnetically levitated vehicle can find their place. For the guidance of a vehicle, the functional elements 7 serve, which are to be found on both sides of the upper flange. The functional elements 7 are engaged by a vehicle, whereby the under part of a vehicle is to be found in the area of the stator in the clearance space 6. By means of a non-changing cross-section of the beam 1, which is not disturbed by holders or bearing means, operation of a vehicle is made possible having favorable airflow and no repetitive impacts.

The beam 1 is, in the present embodiment, placed on bearing legs 8 which are on the piers 9. The piers 9 are, in this arrangement, in the area of the airflow-relevant zone completely covered by the lower flange 3 of the beam 1 and thus generate no disturbance of the pressurized air from the passage of a vehicle.

The invented shaping of the beam 1 provides, besides the above mentioned advantages, a particularly high transverse structural rigidity, and thus assures a comfortable and reliable operation of a vehicle. Especially because of the layout, in which the lower flange 3 is constructed broader than the upper flange 2, a particularly good stability of the beam 1 is assured. The consumption of material for the invented beam 1, which is high in comparison to that of the state of the technology, is compensated for by the increased favorable airflow characteristics and the energy savings in operation of the vehicle which the beam 1 allows.

By means of this shaping, in particular that of the lower flange 3, of which the upper side is sharply inclined, the entire surface of the beam 1 is so designed that a favorable handling of the slipstream of air away from the beam 1 is attained. The piers 9 are likewise subject to airflow but scarcely affect the dissipation of the escape of the pressurized air.

Figure 2:
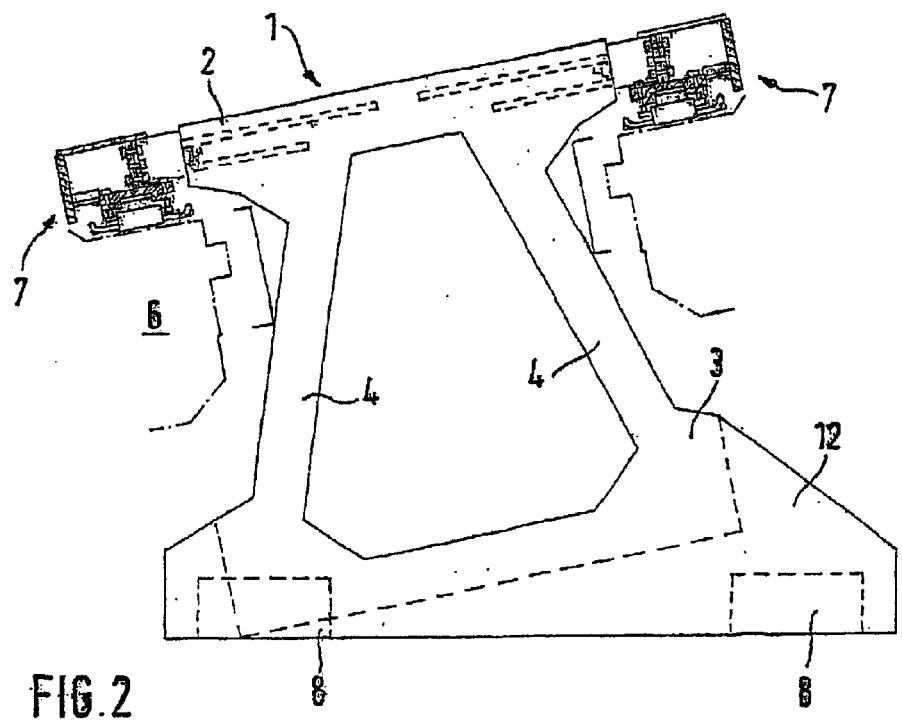
FIG. 2 is a cross-section through an invented canted beam.
Figure 3:
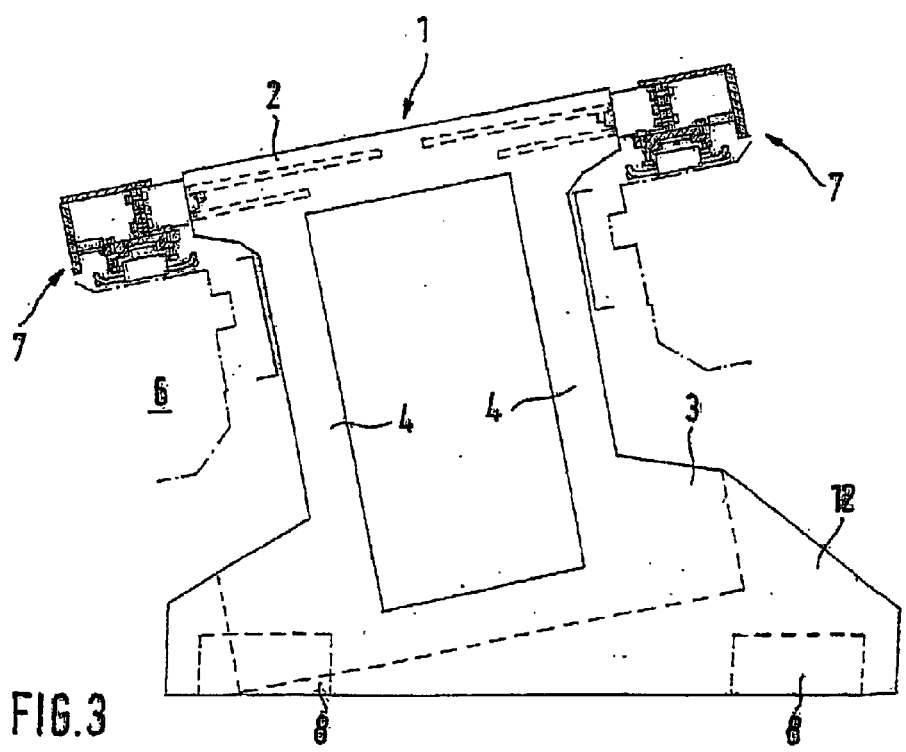
FIG. 3 is another cross-section through an invented beam.

In FIG. 2, another beam 1 is depicted, which is similar to the beam 1 of FIG. 1. This beam 1 is presented in a canted position, which means, that for a bowshaped travel-way, the two functional elements 7 display different heights. In this case, the curved travel for the magnetically levitated vehicle is enabled to be faster and more comfortable. The canting is so brought about, that the beam 1 is not seated directly on the load bearings 8, but that load bearing consoles 12 are supplied, which create the banked position. The piers 9, as well as the thereupon located load bearings 8, thus act together direct with the load bearing consoles 12 and only indirectly with the beam 1, This has the advantage that the manufacture of the piers 9 as well as the load bearings 8 can be done without being dependent as to whether the travel-way is to run in a straight line or be bow shaped. The compensation of the banked incline is done exclusively by the load bearing clamps 12. Alternatively, in any case provision may be made, that the piers 8 themselves take on the inclination and therewith the support of the beam 1 in the curves as well as in the straight section runs. In FIG. 3 is shown a beam 1, altered in contrast to the FIGS. 1, 2. Also, in this case the banking of the beam for a bow shaped run is shown. The beam 1 comprises, essentially a rectangular cross-section with extending upper and lower flanges, respectively 2 and 3.

Also in this case, care has been taken as to the shaping of the beam 1, so that repeated air impacts during the passage of a magnetically levitated vehicle above are avoided.

The air, which is pressurized by a vehicle in its slipstream is conducted away over the shape of the beam 1, which allows a comfortable travel situation on a vehicle. For a shaping of the beam 1 of this kind, especially in the area of its webs 4, the clearance area 6 for a vehicle is especially well adapted to airflow. The gap between a vehicle and the beam 1 is, as far as elevation is concerned, substantially even, so that even in this aspect a guidance of a vehicle employing streamline technology has been made possible.

Figure 4:
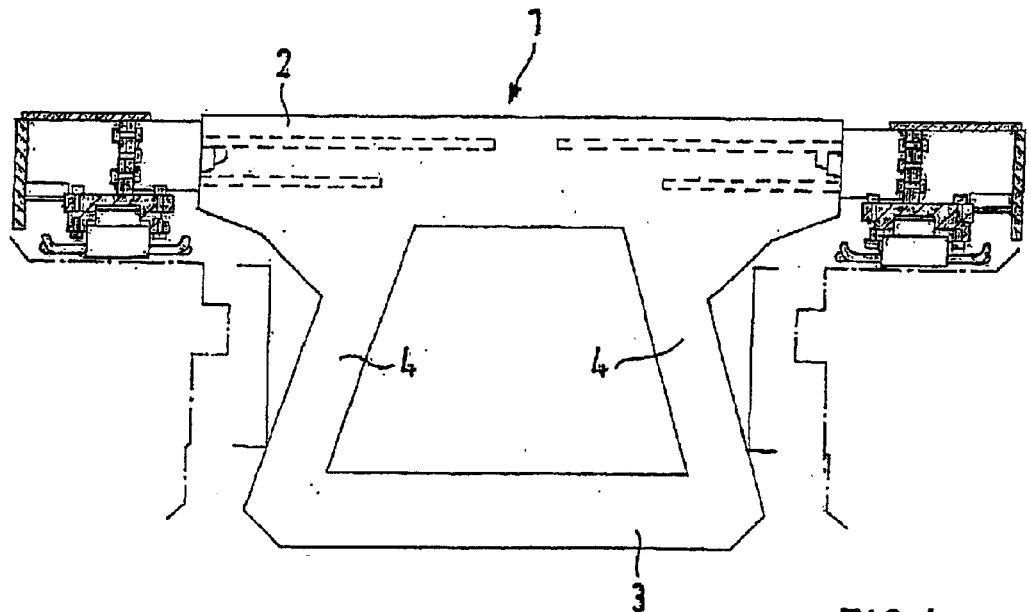
FIG. 4 is a cross-section through an invented beam for a curved section.

FIG. 4 shows a differently designed beam 1. This beam 1 is clearly lower than the previously depicted beams. This becomes possible, in that the support space, in which this beam 1 was constructed was chosen to be essentially shorter. Experience has shown, that beam design, especially for travel in the curves, for which, in the case of beam 1, i.e. the fastening consoles of the function elements 7 must be adjusted, can be done essentially more favorably if the individual beams 1 are made shorter. The adjustment on the individual beams is carried out essentially faster and with more exactness due to the shorter chord, which the beam 1 assumes in the travel-way bend. In addition, because of the shorter spacing intervals of the supports, to maintain an equal rigidity of the beam 1 a lesser height of the beam 1 is necessary, whereby, however, construction material is saved, when compared with that used in the case of the straight sections.

Figure 5:
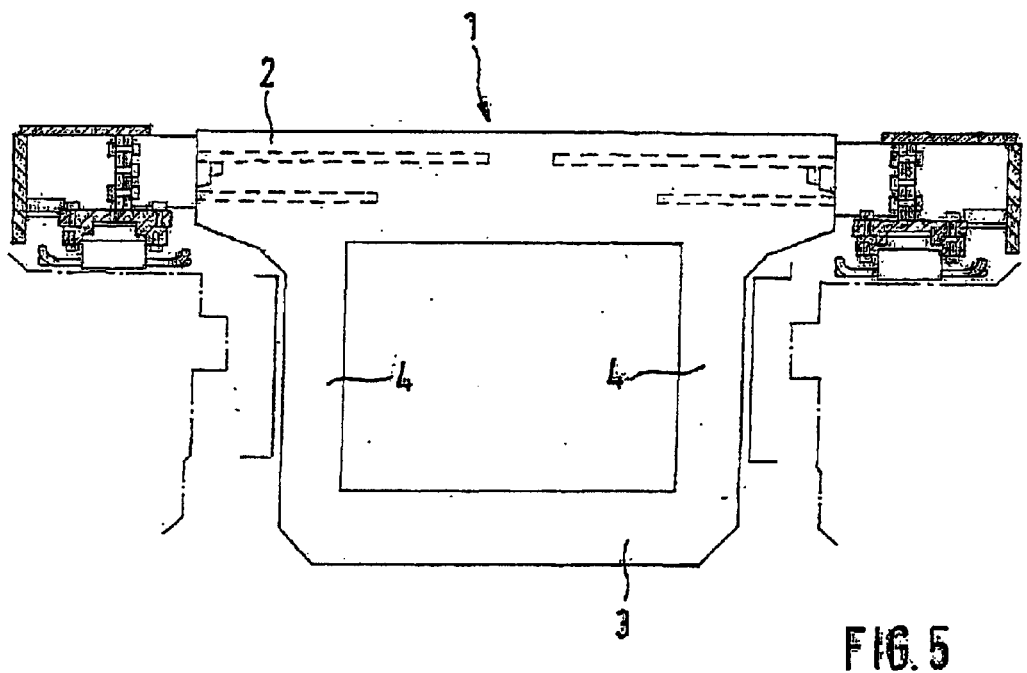
FIG. 5 is a further cross section through an invented beam for a curved section.

While the beam, in accord with FIG. 4, corresponds in its fundamental shape to the beams of the FIGS. 1 and 2, in a further embodiment shown in FIG. 5, the beam has the basic outline of FIG. 3. It presents the idea, that the beams in the FIGS. 3 and 5 can be combined with one another, and that the beams of the FIGS. 1 or 2 and 4 can be combined with one another. The clearance way is, however, essentially the same for a vehicle, so that similar airflow relationships on the part of a vehicle exist both in straight line travel and in curve travel.

Figure 6:
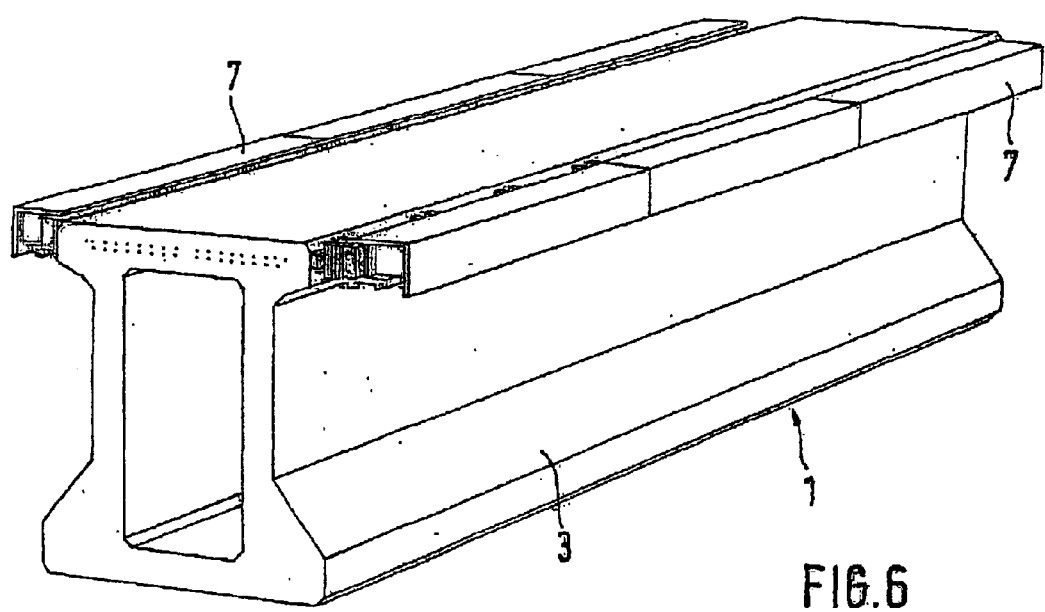
FIG. 6 is a perspective view of an invented beam.
Figure 7:
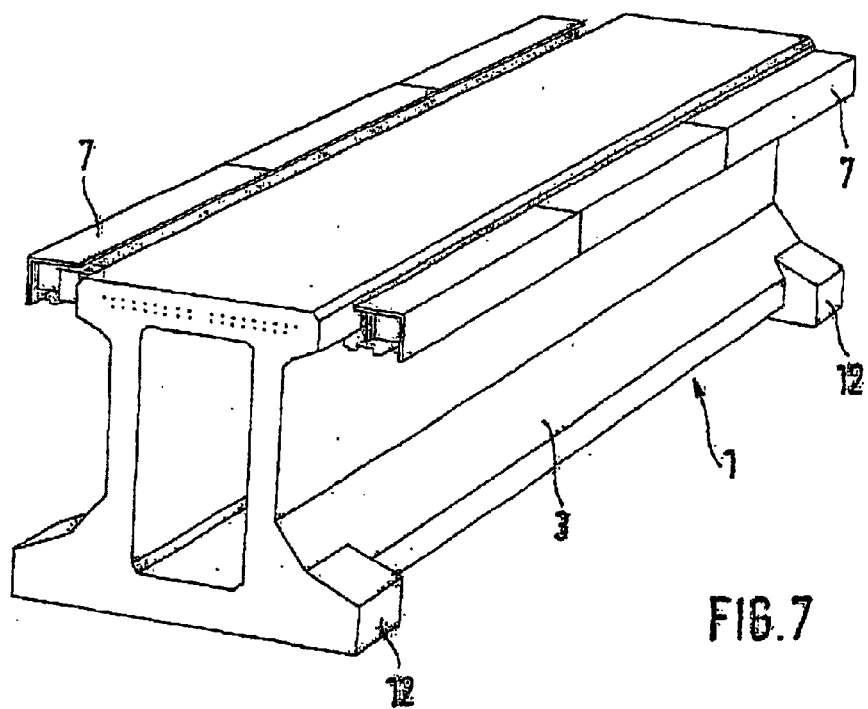
FIG. 7 is a perspective view of a further invented beam.

FIGS. 6 and 7 are perspective presentations of beams 1 in accord with the invention, which are designed to be especially airflow favorable. In FIG. 6 a beam 1 is shown, which, over its entire length, the cross-section shape does not change.

Air pressure impacts on a vehicle by cross-sectional changes of the beam 1 are thus avoided. The loading consoles 12 in FIG. 7 are placed, in this case, deep on the beam 1, in order, that the airflow generated by the vehicle passing above can easily escape, that is to say, cannot act further upon a vehicle.

The beam 1 can also be so constructed that its hollow space is left open at the bottom. The lower flange, in this case is then in two parts. The opening can run throughout the entire beam, or also be interrupted. In this case special advantages are gained in the manufacture of the beam 1, since the demolding of such a beam 1 is very easy to carry out. A stiffening of such a beam 1 can be done by mean of bottom plates, which simultaneous with the molding, or in retrofit fashion can be inserted or also achieved by the use of bulkheads. Instead of the beam with a hollow space, this design can include the beam being solid. The latter is particularly advantageous, if the beams be installed on bridges or primary construction operators and/or the beam lengths are shorter than as is intended for the usual stretches of the railroad.

The invention is not limited to the depicted embodiment. Also other beam shapings, which allow the air pressurized by a vehicle to be favorably left to escape and essentially no airstream impacts upon the passing of a vehicle near the piers are generated are objects of the invention.

What is claimed is:

1. A beam for a railway track guided vehicle system, the beam configured to be supported at spatial intervals on piers, said beam comprising:

an upper flange disposed along a longitudinal length of said beam, said upper flange having opposite laterally outward portions configured for receipt of functional elements for guidance of a track guided vehicle;

opposite side webs extending downwardly at a non-converging angle from said upper flange along said longitudinal length of said beam, said laterally outward portions of said upper flange extending laterally outward of said side webs;

a lower flange disposed at ends of said webs opposite from said upper flange, said lower flange disposed logitudinally along said length said beam;

said beam being an integrally formed unitary concrete unit comprising a uniform cross-sectional shape along the longitudinal length of the beam so as to generate favorable airflow conditions for the track guided vehicle;

said lower flange having lateral ends lower than the side webs, a lateral dimension at least as great as that of said upper flange, and being configured to cover an underlying pier such that the pier does not cause airflow disturbances to the track guided vehicle; and a clearance space defined below said laterally outward portions of said upper flange wherein functional elements received by said laterally outward portions are engaged by the track guided vehicle.

2. The beam as in claim 1, further comprising a longitudinally extending generally hollow space defined within said beam between said side webs.

3. The beam as in claim 2, further comprising at least one access opening into said hollow space.

4. The beam as in claim 3, wherein said access opening is defined in said lower flange between said side webs.

5. The beam as in claim 2, wherein said hollow space is configured for receipt of supply lines or communication lines for the vehicle system.

6. The beam as in claim 1, wherein said lower flange comprises load bearing consoles in the area where said beam is supported by the piers, said load bearing consoles generally covering the piers and defining a favorable airflow profile in the area of the piers.

7. The beam as in claim 1, further comprising support elements configured on an underside of said lower flange for supporting said beam on the piers.

8. The beam as in claim 7, wherein said lower flange comprises load bearing consoles in the area where said beam is supported by the piers, said load bearing consoles generally covering the piers and defining a favorable airflow profile in the area of the piers, said support elements configured on an underside of said load bearing consoles.

9. The beam as in claim 1, wherein said beam is a precise concrete component.

10. The beam as in claim 1, wherein said lower flange is wider than said upper flange in a transverse direction, said side webs diverging from said upper flange to said lower flange such that said beam has a generally trapezoidal shape.

11. The beam as in claim 1, further comprising a longitudinally extending generally hollow space defined within said beam between said side webs and said hollow space being capable of receiving at least one internal bulkhead spanning between said side webs.

12. The beam as in claim 1, wherein said beam is for curved areas of the railway track system and has a shorter longitudinal length as compared to a said beam for straight areas of the railway track system.

13. The beam as in claim 1, wherein said beam is for curved areas of the railway track system and supported on the piers rotated about a longitudinal axis therethrough so as to have a banked orientation.

14. The beam as in claim 13, wherein said lower flange comprises load bearing consoles in the area where said beam is supported by the piers, said load bearing consoles generally covering the piers and defining an inclined support for said beam such that said beam is rotated about its longitudinal axis at a banked orientation.

15. The beam as in claim 13, wherein opposite said laterally outward portions of said upper flange are offset in height as a result of the banked orientation of said beam.

16. The beam as in claim 1, further comprising a longitudinally extending generally hollow space defined within said beam between said side webs, said lower flange can be formed in two parts.

\* \* \* \* \*